(12) United States Patent
Basappa et al.

(10) Patent No.: US 9,102,358 B2
(45) Date of Patent: Aug. 11, 2015

(54) VEHICLE WITH LATERAL LOAD TRANSFERRING MEMBER ATTACHED TO FRAME RAIL

(71) Applicant: GM GLOBAL TECHNOLOGY OPERATIONS LLC, Detroit, MI (US)

(72) Inventors: Vedanth M. Basappa, Birch Run, MI (US); Bhushan W. Dandekar, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 83 days.

(21) Appl. No.: 14/087,170

(22) Filed: Nov. 22, 2013

(65) Prior Publication Data

US 2015/0145282 A1 May 28, 2015

(51) Int. Cl.
  *B60N 99/00* (2006.01)
  *B62D 25/08* (2006.01)
  *B62D 21/15* (2006.01)

(52) U.S. Cl.
  CPC .............. *B62D 25/08* (2013.01); *B62D 21/152* (2013.01)

(58) Field of Classification Search
  CPC ............................... B60D 25/08; B60D 21/152
  See application file for complete search history.

(56) References Cited

U.S. PATENT DOCUMENTS

| | | | | | |
|---|---|---|---|---|---|
| 2,901,266 | A | * | 8/1959 | Lindsay | 280/785 |
| 4,147,379 | A | * | 4/1979 | Winslow | 280/781 |
| 5,561,902 | A | * | 10/1996 | Jacobs et al. | 29/897.2 |
| 6,183,013 | B1 | * | 2/2001 | Mackenzie et al. | 280/797 |
| 6,513,242 | B1 | * | 2/2003 | Christofaro et al. | 29/897.2 |
| 6,769,178 | B1 | * | 8/2004 | Beckman | 29/897.2 |
| 2007/0057534 | A1 | * | 3/2007 | Ziaja et al. | 296/193.01 |

* cited by examiner

Primary Examiner — Lori L Lyjak
(74) Attorney, Agent, or Firm — Quinn Law Group, PLLC (57) ABSTRACT

A vehicle includes a frame rail that extends along and is longitudinally offset from a longitudinal axis. A load transferring member includes a first axial end that is attached to an outboard surface of the frame rail. The load transferring member extends along a centerline thereof, toward the forward axial end of the frame rail, to a second axial end of the load transferring member. The centerline of the load transferring member extends between the first axial end and the second axial end of the load transferring member to define a concave curved shape relative to the outboard surface of the frame rail. The load transferring member includes a cross sectional shape perpendicular to the centerline of the load transferring member that increases in area, when measured from the second axial end moving toward the first axial end.

20 Claims, 5 Drawing Sheets

VEHICLE WITH LATERAL LOAD TRANSFERRING MEMBER ATTACHED TO FRAME RAIL

TECHNICAL FIELD

The invention generally relates to a vehicle having a load transferring member for transferring an applied load to a longitudinally extending frame rail.

BACKGROUND

Vehicles include some form of a support structure, such as a chassis, which often includes a pair of laterally offset frame rails. A load bearing beam may be attached to a forward end of the frame rails, and often extends laterally outboard of the frame rails. In the event of an offset applied load or force, in which an object contacts a distal end of the load bearing beam that is laterally offset outboard of one of the frame rails, the offset applied load should be transmitted or transferred to the adjacent frame rail.

SUMMARY

A vehicle is provided. The vehicle includes a frame rail that extends along and is longitudinally offset from a longitudinal axis. The frame rail includes a forward axial end, and defines an outboard surface relative to the longitudinal axis. A load transferring member includes a first axial end that is attached to the outboard surface of the frame rail. The load transferring member extends along a centerline of the load transferring member to a second axial end of the load transferring member. The centerline of the load transferring member extends between the first axial end and the second axial end of the load transferring member to define a concave curved shape relative to the outboard surface of the frame rail. The load transferring member includes a cross sectional shape perpendicular to the centerline of the load transferring member that increases in area, when measured sequentially from the second axial end moving toward the first axial end.

Accordingly, the load transferring members operate to transfer an applied load applied to an outer forward corner of the vehicle to one of the frame rails. In response to an applied load, in which an object contacts a corner of the vehicle that is laterally offset outboard of one of the frame rails, the load transferring member disposed adjacent thereto operates to transfer both a longitudinal component of the applied load and a lateral component of the applied load to one of the frame rails. The lateral component of the applied load transferred to the frame rail tends to kink or bend the frame rail and urges the vehicle laterally away from the object, while the longitudinal component of the applied load transferred to the frame rail slows the vehicle. In addition, the load transferring members are deformable to absorb energy early in response to an applied load, and thereby help to reduce vehicle deceleration.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, a vehicle is generally shown at 20. The vehicle 20 may include any shape, size, and/or style of vehicle 20 that includes a chassis 22, such as but not limited to a sedan, a sport utility vehicle, a truck, van, etc.

Figure 1:
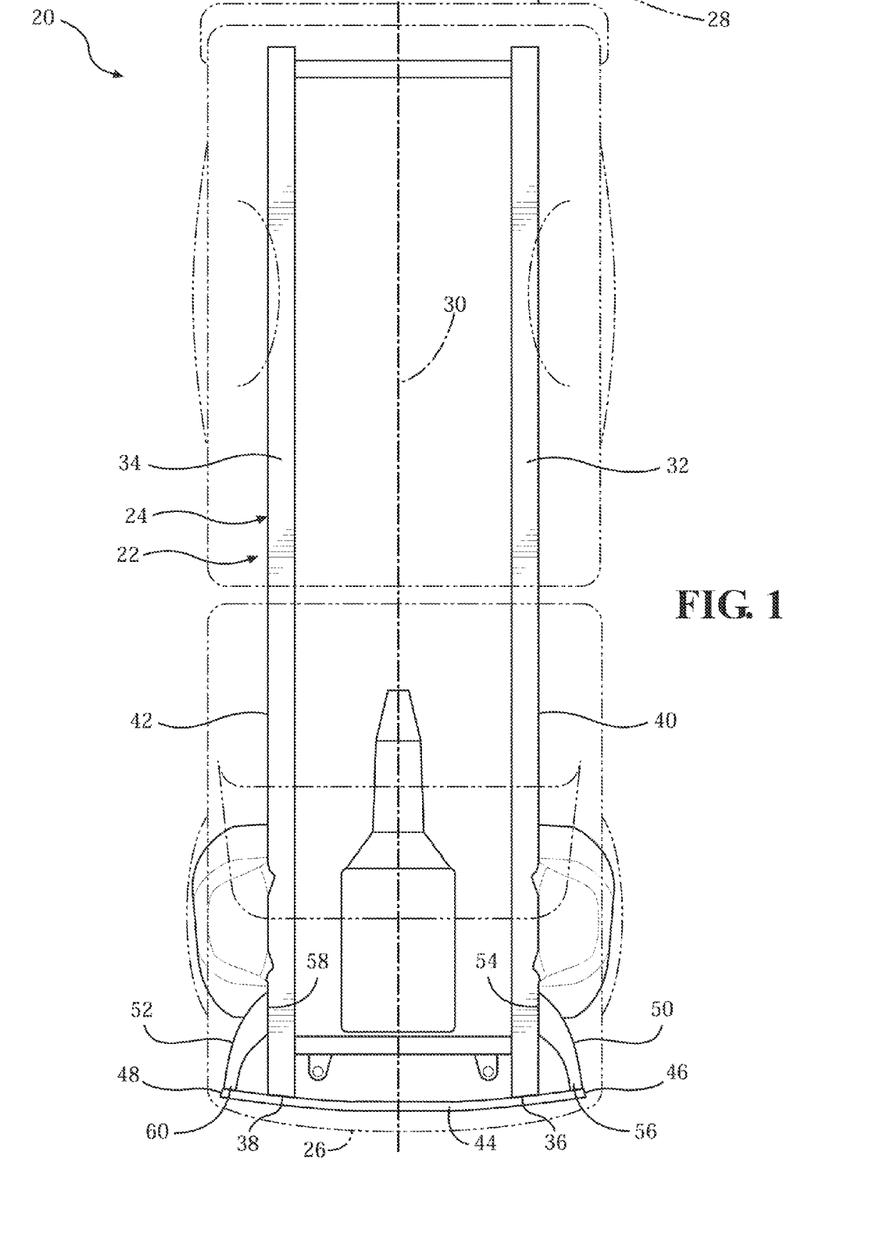
FIG. 1 is a schematic plan view of a vehicle showing a chassis of the vehicle.

Referring to FIG. 1, the chassis 22 of the vehicle 20 includes a primary support structure 24. The primary support structure 24 supports the various components of the vehicle 20, such as but not limited to the drivetrain, wheels, axles, body panels, etc. The primary support structure 24 includes a forward end 26 and a rearward end 28. The rearward end 28 is spaced from the forward end 26 along a longitudinal axis 30. The longitudinal axis 30 extends along a longitudinal center line of the vehicle 20. While the primary support structure 24 is shown schematically in the Figures as a standard vehicle 20 body on frame structure, it should be appreciated that the support structure may be configured differently than shown in the Figures, such as but not limited to a unibody configuration. The primary support structure 24 includes a first frame rail 32 and a second frame rail 34. The second frame rail 34 is laterally offset from the first frame rail 32 on opposing lateral sides of the longitudinal axis 30. If the primary support structure 24 is configured as a unibody construction, then the first frame rail 32 and the second frame rail 34 may be described as a first motor rail and a second motor rail respectively.

The first frame rail 32 includes a forward axial end 36 disposed at the forward end 26 of the primary support structure 24. Similarly, the second frame rail 34 includes a forward axial end 38 disposed at the forward end 26 of the primary support structure 24. Additionally, the first frame rail 32 defines an outboard surface 40 relative to the longitudinal axis 30, and the second frame rail 34 defines an outboard surface 42 relative to the longitudinal axis 30. As used herein, the term "outboard" refers to a location relative to a center of the vehicle 20 along the longitudinal axis 30 that is located further away from an "inboard" location. As such, an inboard location is disposed nearer the center of the vehicle 20 relative to an outboard location, which is disposed farther from the center of the vehicle 20.

A load bearing beam 44 is attached to the forward axial ends 36, 38 of each of the first frame rail 32 and the second frame rail 34. The load bearing beam 44 is disposed and extends transverse relative to the longitudinal axis 30. As shown in FIGS. 1 through 4, the load bearing beam 44 may extend outboard of the first frame rail 32, relative to the longitudinal axis 30, to a first distal end 46. Similarly, the load bearing beam 44 may extend outboard of the second frame rail 34, relative to the longitudinal axis 30, to a second distal end 48. The load bearing beam 44 may be attached to the first frame rail 32 and the second frame rail 34 in any suitable manner, such as but not limited to a bolted connection therebetween. The load bearing beam 44 operates to transmit frontal applied loads to the first frame rail 32 and the second frame rail 34 respectively.

Figure 2:
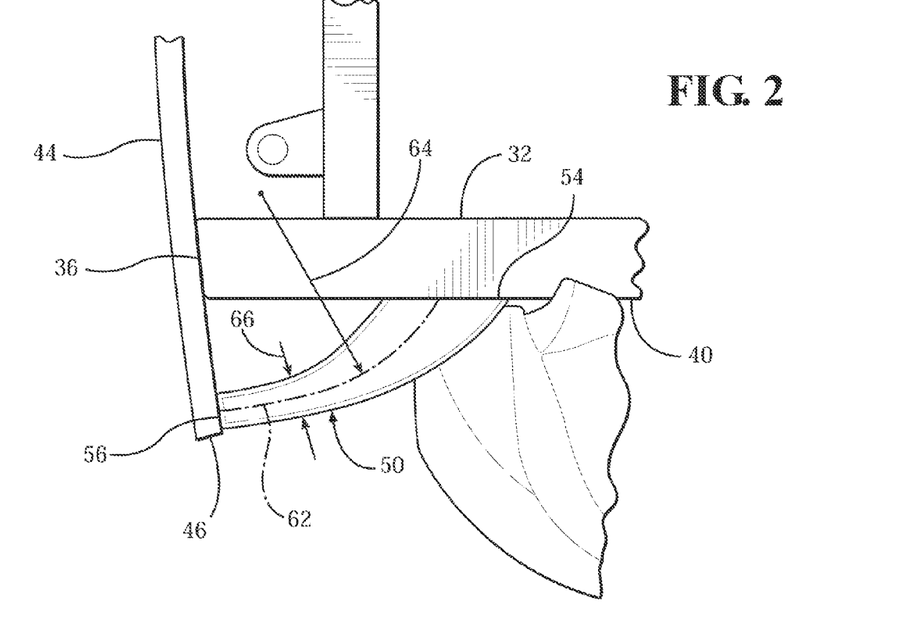
FIG. 2 is an enlarged schematic fragmentary plan view of the chassis showing a first load transferring member.
Figure 3:
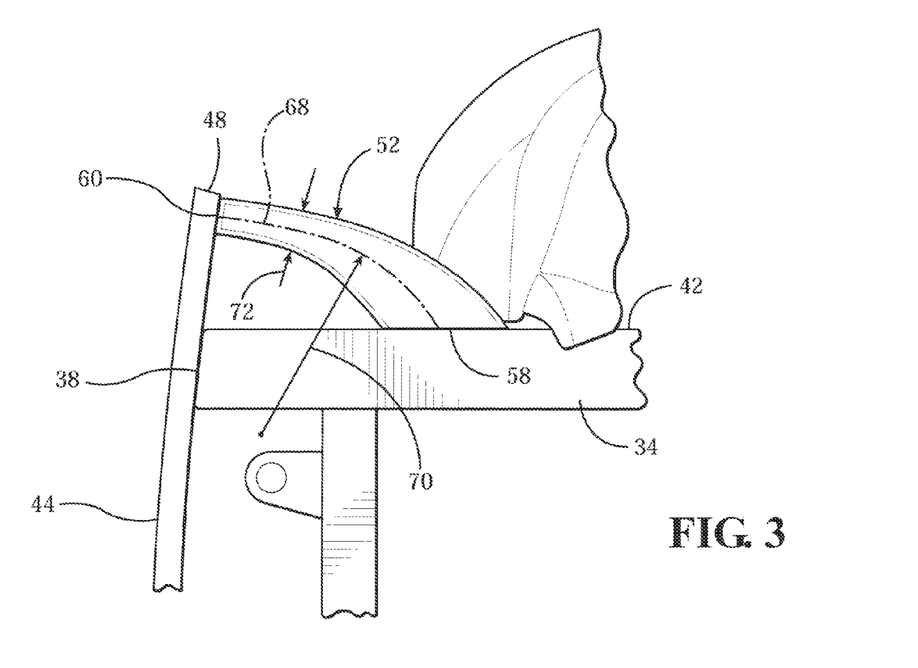
FIG. 3 is an enlarged schematic fragmentary plan view of the chassis showing a second load transferring member.

The chassis 22 further includes a first load transferring member 50 and a second load transferring member 52. Referring to FIG. 2, the first load transferring member 50 includes a first axial end 54 attached to the outboard surface 40 of the first frame rail 32, and a second axial end 56 that may be but is not required to be attached to the load bearing beam 44. As shown in FIGS. 1 and 2, the first axial end 54 of the first load transferring member 50 is fixedly attached to the first frame rail 32, and the second axial end 56 of the first load transferring member 50 is fixedly attached to the load bearing beam 44, adjacent to the first distal end 46 of the load bearing beam 44. Referring to FIG. 3, the second load transferring member 52 includes a first axial end 58 attached to the outboard surface 42 of the second frame rail 34, and a second axial end 60 that may be but is not required to be attached to the load bearing beam 44. As shown in the FIGS. 1, 3 and 4, the first axial end 58 of the second load transferring member 52 is fixedly attached to the second frame rail 34, and the second axial end 60 of the second load transferring member 52 is fixedly attached to the load bearing beam 44, adjacent to the second distal end 48 of the load bearing beam 44.

The first load transferring member 50 and the second load transferring member 52 may be attached to the first frame rail 32 and the second frame rail 34 respectively in any suitable manner. For example, the first load transferring member 50 and the second load transferring member 52 may be attached to the first frame rail 32 and the second frame rail 34 through a bolted connection, a welded connection, or by some other similar and/or suitable manner of connection.

Referring to FIG. 2, the first load transferring member 50 extends along a first centerline 62, between the first axial end 54 of the first load transferring member 50 and the second axial end 56 of the first load transferring member 50. The first centerline 62 of the first load transferring member 50 extends between the first axial end 54 and the second axial end 56 of the first load transferring member 50, and is the geometric three dimensional center of the first load transferring member 50. The first centerline 62 extends from the first axial end 54 of the first load transferring member 50 at the outboard surface 40 of the first frame rail 32 to the second axial end 56 of the first load transferring member 50 to define a concave curved shape relative to the outboard surface 40 of the first frame rail 32. Accordingly, the first load transferring member 50 may be described, when viewed from above such as in FIGS. 1 and 2, as extending outboard, away from the outboard surface 40 of the first frame rail 32, along a curve that bends toward the outboard surface 40 of the first frame rail 32. As such, the first centerline 62 of the first load transferring member 50 defines a first radius 64 having a center that is positioned inboard of the first frame rail 32 relative to the longitudinal axis 30.

The first load transferring member 50 includes a cross sectional shape perpendicular to the first centerline 62 of the first load transferring member 50. The cross sectional shape of the first load transferring member 50 increases in area when measured sequentially from the second axial end 56 of the first load transmitting member moving toward the first axial end 54 of the first load transmitting member. The cross sectional shape of the first load transferring member 50 may be continuously variable between the second axial end 56 and the first axial end 54 of the first load transmitting member.

Preferably, and as shown, the cross sectional shape of the first load transferring member 50 defines a substantially rectangular shape having a width 66 and a height. As viewed on the page of FIGS. 1 and 2, the height of the cross sectional shape of the first load transmitting member extends into the page of the Figures. As shown in the Figures, the width 66 of the cross sectional shape of the first load transferring member 50 is variable between the second axial end 56 and the first axial end 54, and the height of the cross sectional shape of the first load transferring member 50 is constant. However, it should be appreciated that the width 66 of the cross sectional shape of the first load transferring member 50 may be constant, and that the height of the cross sectional shape of the first load transmitting member may vary along the first centerline 62. Furthermore, it should be appreciated that both the width 66 and the height of the cross sectional shape of the first load transmitting mechanism may vary along the first centerline 62.

Referring to FIG. 3, the second load transferring member 52 extends along a second centerline 68, between the first axial end 58 of the second load transferring member 52 and the second axial end 60 of the second load transferring member 52. The second centerline 68 of the second load transferring member 52 extends between the first axial end 58 and the second axial end 60 of the second load transferring member 52, and is the geometric three dimensional center of the second load transferring member 52. The second centerline 68 extends from the first axial end 58 at the outboard surface 42 of the second frame rail 34 to the second axial end 60 of the second load transferring member 52 to define a concave curved shape relative to the outboard surface 42 of the second frame rail 34. Accordingly, the second load transferring member 52 may be described, when viewed from above such as in FIGS. 1, 3, and 4 as extending outboard, away from the outboard surface 42 of the second frame rail 34, along a curve that bends toward the outboard surface 42 of the second frame rail 34. As such, the second centerline 68 of the second load transferring member 52 defines a second radius 70 having a center that is positioned inboard of the second frame rail 34 relative to the longitudinal axis 30.

The second load transferring member 52 includes a cross sectional shape perpendicular to the second centerline 68 of the second load transferring member 52. The cross sectional shape of the second load transferring member 52 increases in area when measured sequentially from the second axial end 60 of the second load transmitting member moving toward the first axial end 58 of the second load transmitting member. The cross sectional shape of the second load transferring member 52 may be continuously variable between the second axial end 60 and the first axial end 58 of the second load transmitting member.

Preferably, and as shown, the cross sectional shape of the second load transferring member 52 defines a substantially rectangular shape having a width 72 and a height. As viewed on the page of FIGS. 1, 3 and 4, the height of the cross sectional shape of the second load transmitting member extends into the page of the Figures. As shown in the Figures, the width 72 of the cross sectional shape of the second load transferring member 52 is variable between the second axial end 60 and the first axial end 58, and the height of the cross sectional shape of the second load transferring member 52 is constant. However, it should be appreciated that the width 72 of the cross sectional shape of the second load transferring member 52 may be constant, and that the height of the cross sectional shape of the second load transmitting member may vary along the second centerline 68. Furthermore, it should be appreciated that both the width 72 and the height of the cross sectional shape of the second load transmitting member may vary along the second centerline 68.

Figure 4:
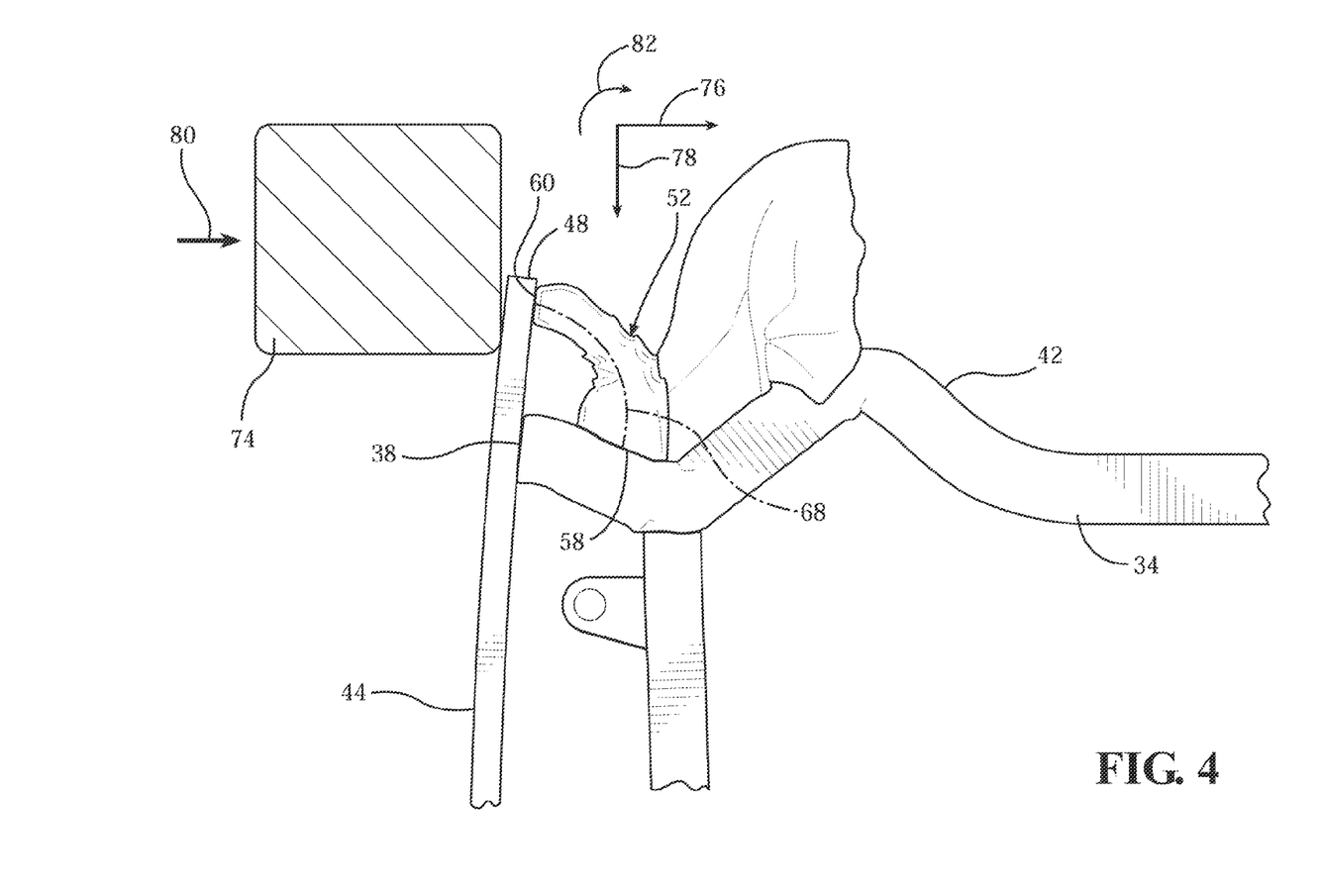
FIG. 4 is an enlarged schematic fragmentary plan view of the chassis showing force distribution during a loading event.

Referring to FIG. 4, in the event of a laterally offset applied load, in which a forward lateral corner of the vehicle 20 contacts an object 74, the first load transferring member 50 and the second load transferring member 52 are operable to transfer both a longitudinal component 76 and a lateral component 78 of an applied load 80 to the first frame rail 32 or the second frame rail 34 respectively, thereby allowing the first frame rail 32 and the second frame rail 34 to absorb the applied load respectively. While FIG. 4 only shows the second load transferring member 52 and the force distribution therefore, it should be appreciated that the first load transferring member 50 operates in a similar fashion on the opposing lateral side of the vehicle 20. The longitudinal component 76 of the applied load 80 is directed axially along the longitudinal axis 30 to slow the fore/aft movement of the vehicle 20. The lateral component 78 of the applied load 80 is directed transverse relative to the longitudinal axis 30, i.e., approximately perpendicular to the longitudinal axis 30, to deform the first frame rail 32 or the second frame rail 34 respectively, and to force the vehicle 20 away from the object 74.

Referring to FIG. 4, in the event of the lateral offset applied load, in which the vehicle 20 contacts the object 74 with the second distal end 48 of the load bearing beam 44, the object 74 imparts the applied load 80 to the second distal end 48 of the load bearing beam 44, which causes the load bearing beam 44 to bend or collapse around the forward axial end 38 of the second frame rail 34 in a rotational direction 82. As the second distal end 48 of the load bearing beam 44 collapses around the second frame rail 34, the applied load 80 is transmitted to the second load transferring member 52. Because the second load transferring member 52 is curved relative to the second frame rail 34, the second load transferring member 52 transmits both the longitudinal component 76 of the applied load 80 and the lateral component 78 of the applied load 80 to the second frame rail 34. It should be appreciated that the relative values of the longitudinal component 76 and the lateral component 78 are dependent upon the geometry of the curve defining the second load transferring member 52, i.e., the degree of curvature of the second centerline 68 of the second load transmitting member. The lateral component 78 of the applied load 80 tends to bend and/or kink the second frame rail 34 inboard. Because of the curved shape of the second load transferring member 52, the second load transferring member 52 will tend to bend or crumple outboard as the second distal end 48 rotates rearward around the forward axial end 38 of the second frame rail 34. The deformation of the second load transferring member 52 absorbs a portion of the applied load 80. The degree of curvature of the second load transmitting member, and the variable geometric cross sectional shape of the second load transmitting member, allow the second load transmitting member to be tuned and/or designed to meet desired performance characteristics.

Although not specifically shown in FIG. 4, it should be appreciated that the first load transferring member 50 operates in the same manner as the second load transferring member 52 described above. Specifically, in the event of the lateral offset applied load, in which the vehicle 20 contacts the object 74 with the first distal end 46 of the load bearing beam 44, the object 74 imparts the applied load 80 to the first distal end 46 of the load bearing beam 44, which causes the load bearing beam 44 to bend or collapse around the forward axial end 36 of the first frame rail 32. As the first distal end 46 of the load bearing beam 44 collapses around the first frame rail 32, the applied load 80 is transmitted to the first load transferring member 50. Because the first load transferring member 50 is curved relative to the first frame rail 32, the first load transferring member 50 transmits both the longitudinal component 76 of the applied load 80 and the lateral component 78 of the applied load 80 to the first frame rail 32. It should be appreciated that the relative values of the longitudinal component 76 and the lateral component 78 are dependent upon the geometry of the curve defining the first load transferring member 50, i.e., the degree of curvature of the first centerline 62 of the first load transmitting member. The lateral component 78 of the applied load 80 tends to bend and/or kink the first frame rail 32 inboard. Because of the curved shape of the first load transferring member 50, the first load transferring member 50 will tend to bend or crumple outboard as the first distal end 46 rotates rearward around the forward axial end 36 of the first frame rail 32. The deformation of the first load transferring member 50 absorbs a portion of the applied load 80. The degree of curvature of the first load transmitting member, and the variable geometric cross sectional shape of the first load transmitting member, allow the first load transmitting member to be tuned and/or designed to meet desired performance characteristics.

Figure 5:
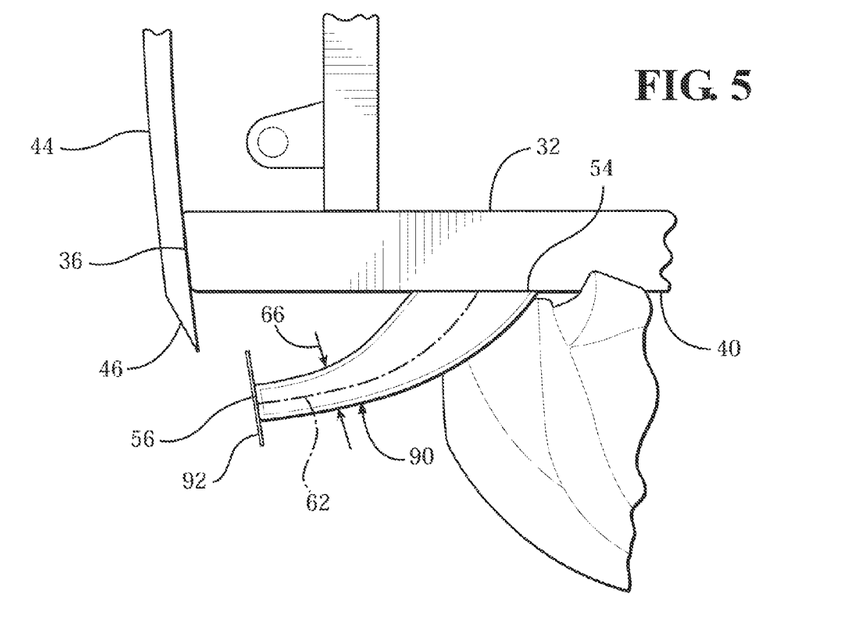
FIG. 5 is an enlarged schematic fragmentary plan view of the chassis showing an alternative embodiment of the first load transferring member.
Figure 6:
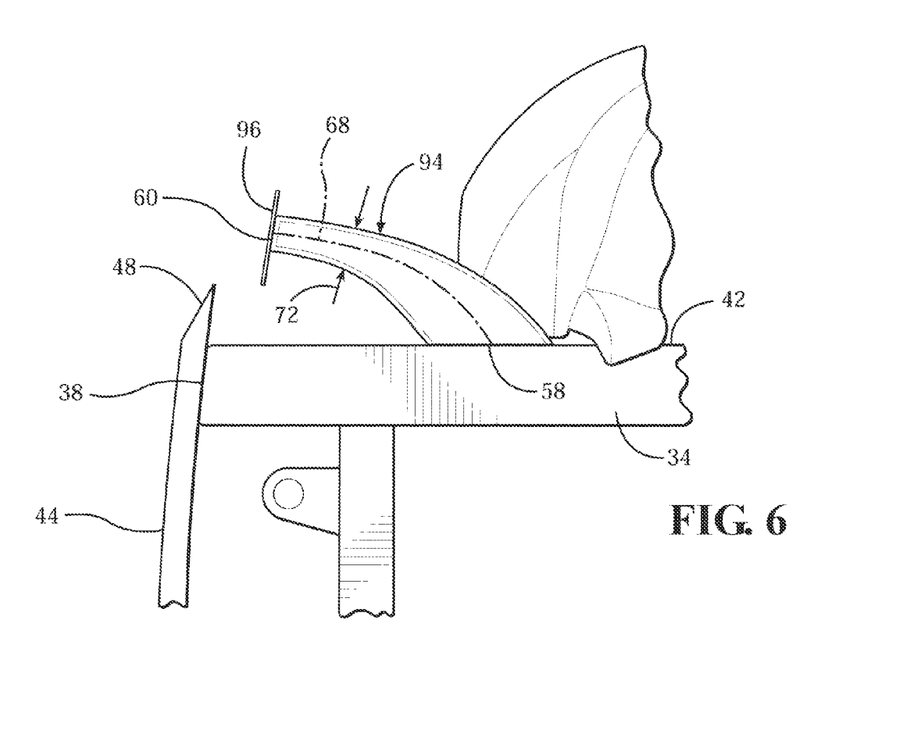
FIG. 6 is an enlarged schematic fragmentary plan view of the chassis showing an alternative embodiment of the second load transferring member.

Referring to FIG. 5, an alternative embodiment of the first load transferring member is shown at 90. The first load transferring member 90 may include a first plate 92 attached to the second axial end 56 of the first load transferring member 90. As such, the first load transferring member 90 is not directly attached to the load bearing beam 44, and the load bearing beam 44 need not extend outboard of the first frame rail 32. The first plate 92 distributes the applied load to the first load transferring member 90 in the event of the frontal offset applied load, described above. An alternative embodiment of the second load transferring member is generally shown at 94. The alternative embodiment of the second load transferring member 94 is configured similarly to the alternative embodiment of the first load transferring member 90. Specifically, referring to FIG. 6, the second load transferring member 94 may include a second plate 96 attached to the second axial end 60 of the second load transferring member 94. As such, the second load transferring member 94 is not directly attached to the load bearing beam 44, and the load bearing beam 44 need not extend outboard of the second frame rail 34. The second plate 96 distributes the applied load to the second load transferring member 94 in the event of the frontal offset applied load, described above.

Figure 7:
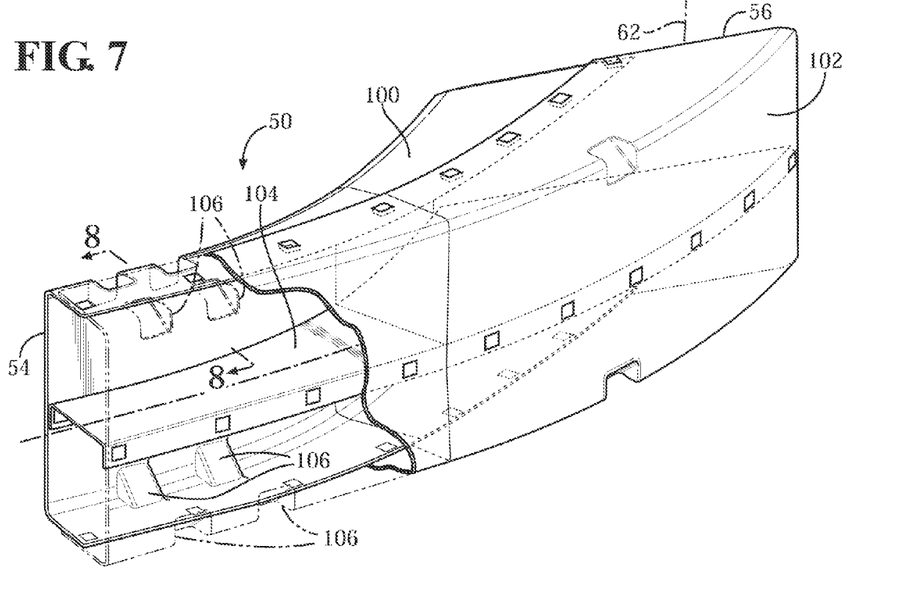
FIG. 7 is a schematic perspective fragmentary view of the first load transferring member.
Figure 8:
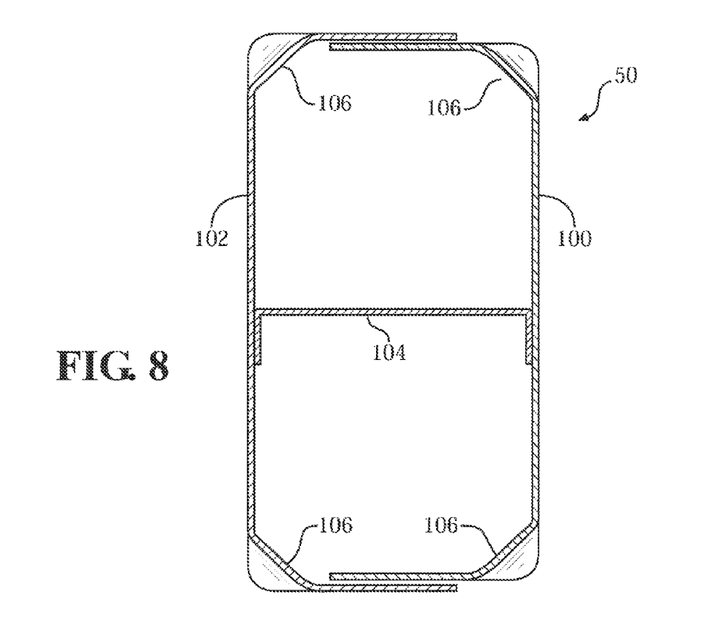
FIG. 8 is a schematic cross sectional view of the first load transferring member shown in FIG. 7.

Referring to FIGS. 7 and 8, the first load transferring member 50 is shown. While FIGS. 7 and 8 specifically show the first load transferring member, it should be appreciated that the detailed description below specifically describing the first load transferring member is applicable to the second load transferring member 52. As shown in FIGS. 7 and 8, the first load transferring member may be constructed of an inner half 100, and an outer half 102. The inner half 100 and the outer half 102 are attached together, such as by welding or some other suitable method, to define a substantially tubular member that extends along the first centerline 62. A shear plate 104 is disposed between the inner half 100 and the outer half 102, and is attached to each of the inner half 100 and the outer half 102. The shear plate 104 may be attached to the inner half 100 and the outer half 102 in any suitable manner, such as but not limited to welding the shear plate 104 to each of the inner half 100 and the outer half 102. The shear plate 104 is disposed at an approximate vertical midsection of the first load transferring member 50, substantially on the first centerline 62. As shown, the shear plate 104 extends the length of the first load transferring member 50. However, it should be appreciated that the shear plate 104 may extend along only a portion of the first load transferring member 50. Additionally, it should be appreciated that the first load transferring member may include more than the single shear plate 104 shown. The shear plate 104 stiffens the vertical walls of the inner half 100 and the outer half 102, and increases the resistance against deformation of the first load transferring member.

The inner half 100 and the outer half 102 may also include one or more crush initiators 106. Each crush initiator 106 is positioned and configured to control the deformation of the first load transferring member 50. As shown, the crush initiators 106 are substantially indentations in the outer corners of the first load transferring member 50.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
a frame rail extending along and longitudinally offset from a longitudinal axis, including a forward axial end, and defining an outboard surface relative to the longitudinal axis; and
a load transferring member having a first axial end attached to the outboard surface of the frame rail, and extending along a centerline of the load transferring member to a second axial end of the load transferring member;
wherein the centerline of the load transferring member extends between the first axial end and the second axial end of the load transferring member to define a concave curved shape relative to the outboard surface of the frame rail.

2. The vehicle as set forth in claim 1 wherein the centerline of the load transferring member defines a radius having a center positioned inboard of the frame rail relative to the longitudinal axis.

3. The vehicle as set forth in claim 1 wherein the load transferring member includes a cross sectional shape perpendicular to the centerline of the load transferring member that increases in area when measured sequentially from the second axial end moving toward the first axial end.

4. The vehicle as set forth in claim 3 wherein the cross sectional shape of the load transferring member is continuously variable between the second axial end and the first axial end.

5. The vehicle as set forth in claim 3 wherein the cross sectional shape of the load transferring member defines a substantially rectangular shape having a width and a height, and wherein the width of the cross sectional shape of the load transferring member is variable between the second axial end and the first axial end.

6. The vehicle as set forth in claim 5 wherein the height of the cross sectional shape of the load transferring member is constant.

7. The vehicle as set forth in claim 1 wherein the load transferring member includes an inner half attached to an outer half to form a tubular member extending along the centerline and defining an open interior, and further includes a shear plate disposed within the open interior of the tubular member, and attached to the inner half and the outer half.

8. The vehicle as set forth in claim 1 wherein the load transferring member includes at least one crush initiator operable to control deformation of the load transferring member.

9. The vehicle as set forth in claim 1 further comprising a load bearing beam attached to the forward axial end of the frame rail, and extending transverse relative to the frame rail to a distal end disposed outboard of the frame rail relative to the longitudinal axis.

10. The vehicle as set forth in claim 9 wherein the second axial end of the load transferring member is connected to the load bearing beam adjacent the distal end of the load bearing beam.

11. A vehicle comprising:
a primary support structure defining a longitudinal axis, and including a frame rail extending along the longitudinal axis and including a forward axial end;
a load bearing beam attached to the forward axial end of the frame rail, and extending transverse relative to the longitudinal axis and the frame rail;
a load transferring member having a first axial end attached to an outboard surface of the frame rail, and extending along a centerline of the load transferring member to a second axial end of the load transferring member;
wherein the centerline of the load transferring member extends between the first axial end and the second axial end of the load transferring member to define a concave curved shape relative to the outboard surface of the frame rail; and
wherein the load transferring member includes a cross sectional shape perpendicular to the centerline of the load transferring member that increases in area when measured sequentially from the second axial end moving toward the first axial end.

12. A vehicle as set forth in claim 11 wherein the load bearing beam extends outboard of the frame rail relative to the longitudinal axis to a distal end, and wherein the second axial end of the load transferring member is connected to the load bearing beam adjacent the distal end of the load bearing beam.

13. A chassis for a vehicle, the chassis comprising:
a primary support structure defining a longitudinal axis, and including a first frame rail and a second frame rail laterally offset from each other on opposing sides of the longitudinal axis, and each including a forward axial end;
a load bearing beam attached to the forward axial end of each of the first frame rail and the second frame rail, wherein the load bearing beam is disposed transverse to the longitudinal axis, and extends outboard of the first frame rail relative to the longitudinal axis to a first distal end, and outboard of the second frame rail relative to the longitudinal axis to a second distal end;
a first load transferring member having a first axial end attached to an outboard surface of the first frame rail, and extending along a centerline of the first load transferring member, toward the load bearing beam, to a second axial end of the first load transferring member, wherein the centerline of the first load transferring member extends between the first axial end and the second axial end of the first load transferring member to define a concave curved shape relative to the outboard surface of the first frame rail; and a second load transferring member having a first axial end attached to an outboard surface of the second frame rail, and extending along a centerline of the second load transferring member, toward the load bearing beam, to a second axial end of the second load transferring member, wherein the centerline of the second load transferring member extends between the first axial end and the second axial end of the second load transferring member to define a concave curved shape relative to the outboard surface of the second frame rail.

14. The chassis as set forth in claim 13 wherein the second axial end of the first load transferring member is connected to the load bearing beam adjacent the first distal end of the load bearing beam, and wherein the second axial end of the second load transferring member is connected to the load bearing beam adjacent the second distal end of the load bearing beam.

15. The chassis as set forth in claim 13 further comprising a first plate attached to the second axial end of the first load transferring member and disposed substantially perpendicular to the centerline of the first load transferring member, and a second plate attached to the second axial end of the second load transferring member and disposed substantially perpendicular to the centerline of the second load transferring member.

16. The chassis as set forth in claim 13 wherein the centerline of the first load transferring member defines a first radius positioned inboard of the first frame rail relative to the longitudinal axis, and wherein the centerline of the second load transferring member defines a second radius positioned inboard of the second frame rail relative to the longitudinal axis.

17. The chassis as set forth in claim 13 wherein the first load transferring member includes a cross sectional shape perpendicular to the centerline of the first load transferring member that increases in size when measured from the second axial end moving toward the first axial end of the first load transferring member, and wherein the second load transferring member includes a cross sectional shape perpendicular to the centerline of the second load transferring member that increases in size when measured from the second axial end moving toward the first axial end of the second load transferring member.

18. The chassis as set forth in claim 17 wherein the cross sectional shape of the first load transferring member is continuously variable between the second axial end and the first axial end of the first load transferring member, and wherein the cross sectional shape of the second load transferring member is continuously variable between the second axial end and the first axial end of the second load transferring member.

19. The chassis as set forth in claim 17 wherein the cross sectional shape of the first load transferring member defines a substantially rectangular shape having a width and a height, and wherein the width of the cross sectional shape of the first load transferring member is variable between the second axial end and the first axial end of the first load transferring member, and wherein the cross sectional shape of the second load transferring member defines a substantially rectangular shape having a width and a height, and wherein the width of the cross sectional shape of the second load transferring member is variable between the second axial end and the first axial end of the second load transferring member.

20. The chassis as set forth in claim 19 wherein the height of the cross sectional shape of the first load transferring member is constant, and wherein the height of the cross sectional shape of the second load transferring member is constant.

* * * * *